United States Patent [19]

Zilberfarb

[11] Patent Number: 5,048,015
[45] Date of Patent: Sep. 10, 1991

[54] INTERFERENCE SOURCE IDENTIFICATION

[75] Inventor: Yossi Zilberfarb, Elberon, N.J.

[73] Assignee: AT&T Bell Laboratories, Murray Hill, N.J.

[21] Appl. No.: 538,367

[22] Filed: Jun. 14, 1990

[51] Int. Cl.$^5$ .............................................. H04J 3/12
[52] U.S. Cl. ................................ 370/110.4; 370/104.1
[58] Field of Search .................. 370/104.1, 107, 110.4, 370/111

[56] References Cited

U.S. PATENT DOCUMENTS 4,280,222  7/1981  Flower ................................. 370/107
4,328,579  5/1982  Hashimoto et al. ................. 370/111
4,610,012  9/1986  Terada et al. ..................... 370/110.4
4,791,653 12/1988  McFarland et al. ................ 370/107
4,901,313  2/1990  Fujikura et al. .................. 370/104.1

Primary Examiner—Douglas W. Olms
Assistant Examiner—Dang Ton

[57] ABSTRACT

A method and apparatus for immediately identifying the presence and the source of interference in a communications system. A separate identification code is superimposed on each signal transmitted from a separate transmitter. At any receiver, if an undesired signal causes interference, it can be idenified via its associated identification code. In one embodiment, spread spectrum chip sequences are used as the identification codes.

16 Claims, 3 Drawing Sheets

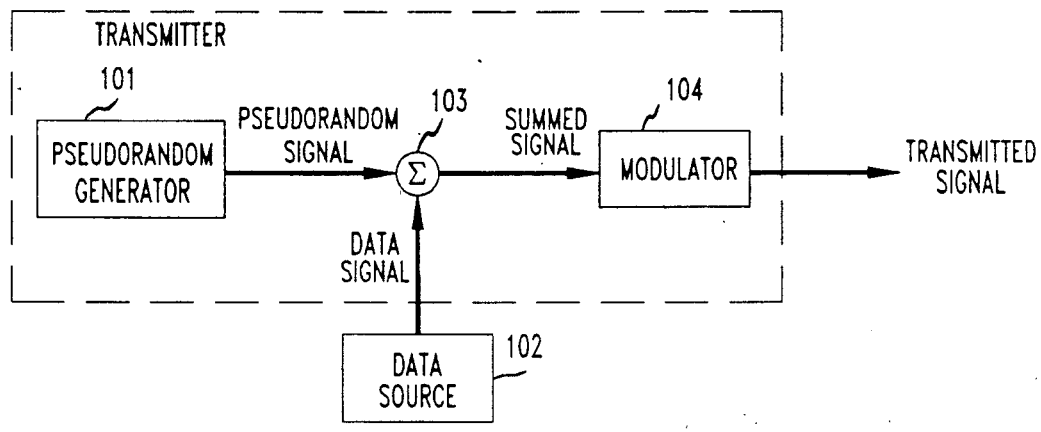
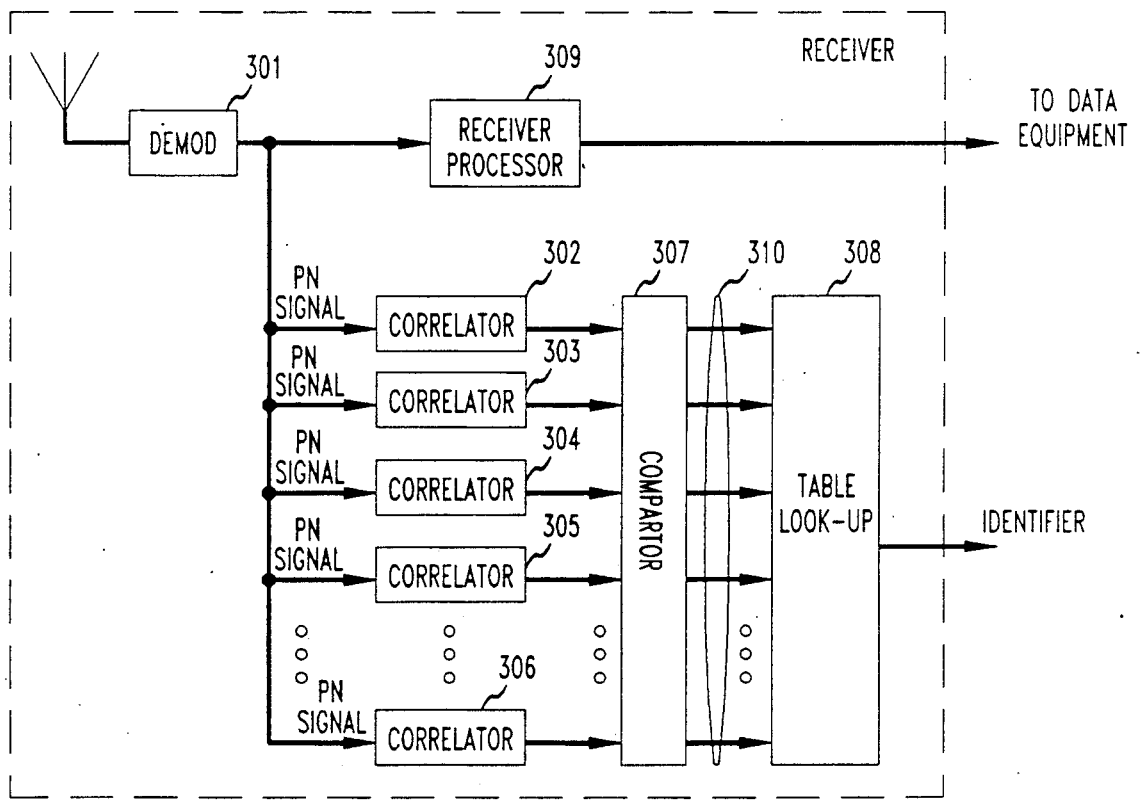

INTERFERENCE SOURCE IDENTIFICATION

TECHNICAL FIELD

This invention relates to communications systems, and more particularly to interference among separate communications channels in a communications system.

BACKGROUND OF THE INVENTION

In satellite and microwave communications, often the same frequency band is utilized in several nonoverlapping spatial regions. In terrestrial systems, for example, each transmitter covers a specific "field of view" and receivers associated with the transmitter are disposed within the field of view and tuned to the proper frequency. For example, a first transmitter may cover a first portion of the United States and use the same frequency band as a second transmitter aimed toward a second portion of the United States. Depending on which field of view a receiver is located in, it will receive the transmissions of one of the transmitters.

Although a receiver in one field of view should be immune from communications in another, this is not the case in practical systems. Excess transmitter power, poorly aimed antennas, and scattering, are just three phenomena which may cause energy to "spillover" into a different field of view. This spillover causes interference in the receivers associated with other transmitters. In satellite communications, where several satellite channels overlap spatially but use different frequency bands, an analogous problem exists among interfering channels.

FIG. 1 is a block diagram which depicts the above discussed problem in a terrestrial/satellite communications system. Transmiters 101-103 are intended to transmit information to receivers 109-113, 114-117, and 104-108, respectively. Additionally, satellite 118 is intended to transmit information to several other receivers (not shown). It can be seen, that if the distance between any two of transmitters 101-103 is not large enough, transmissions from a transmitter will be received by receivers which are associated with a different transmitter.

In practice, in order to determine which particular one of many possible sources is causing the interference, the transmitters must be turned off, one at a time, until turning off a particular transmitter results in substantial reduction in interference. The particular transmitter is then identified as that causing the problem, and appropriate adjustments to this transmitter can then be made.

The problem with the above method of determining which transmitter is the source of interference is that it requires disruptions in service as each transmitter must be shut down for a shot time. Further, when a receiver exhibits degraded performance, there exists no concise method of identifying the problem as an interference problem in the first place. The problem is further compounded by the fact that interference may be caused by the intermodulation products of two or more transmitters making it difficult to determine which combination of transmitters should be adjusted to reduce the interference. Finally, in a satellite system, each of the transmitters may be transmitting to different time zones, making coordination even more difficult.

SUMMARY OF THE INVENTION

These and other problems are overcome in accordance with this invention which relates to a novel method and apparatus for immediately identifying both the existence of, as well as the source of, interference from a transmitter in a multitransmitter communications system, all without disruption of service. In accordance with the invention, a small identification (ID) signal is superimposed on a main signal, and the sum is transmitted from a transmitter. The ID signal is different for each transmitter.

When the system is functioning properly, the only ID signal received by each receiver should be that of the transmitter intended to transmit to that receiver. If any other ID signal appears with any substantial amount of energy at a receiver, it means that the transmitter associated with that ID signal is interfering with the signal being received by the receiver. Thus, by comparing the relative magnitudes of several received ID signals, each receiver can determine if interference occurs, the source of such interference, and the relative strength of the interference, almost instantaneously and with no interruption of service.

In a preferred embodiment, the ID signal is a pseudorandom, spread spectrum signal, and the comparing is accomplished by using a bank of matched filters, surface acoustic wave filters, or correlators.

BRIEF DESCRIPTION OF THE DRAWING

FIG. 2 depicts a transmitter capable of superimposing an identification signal on a transmitted data signal.

FIG. 3 shows a receiver for receiving a signal transmitted by the transmitter of FIG. 2.

DETAILED DESCRIPTION

Figure 1:
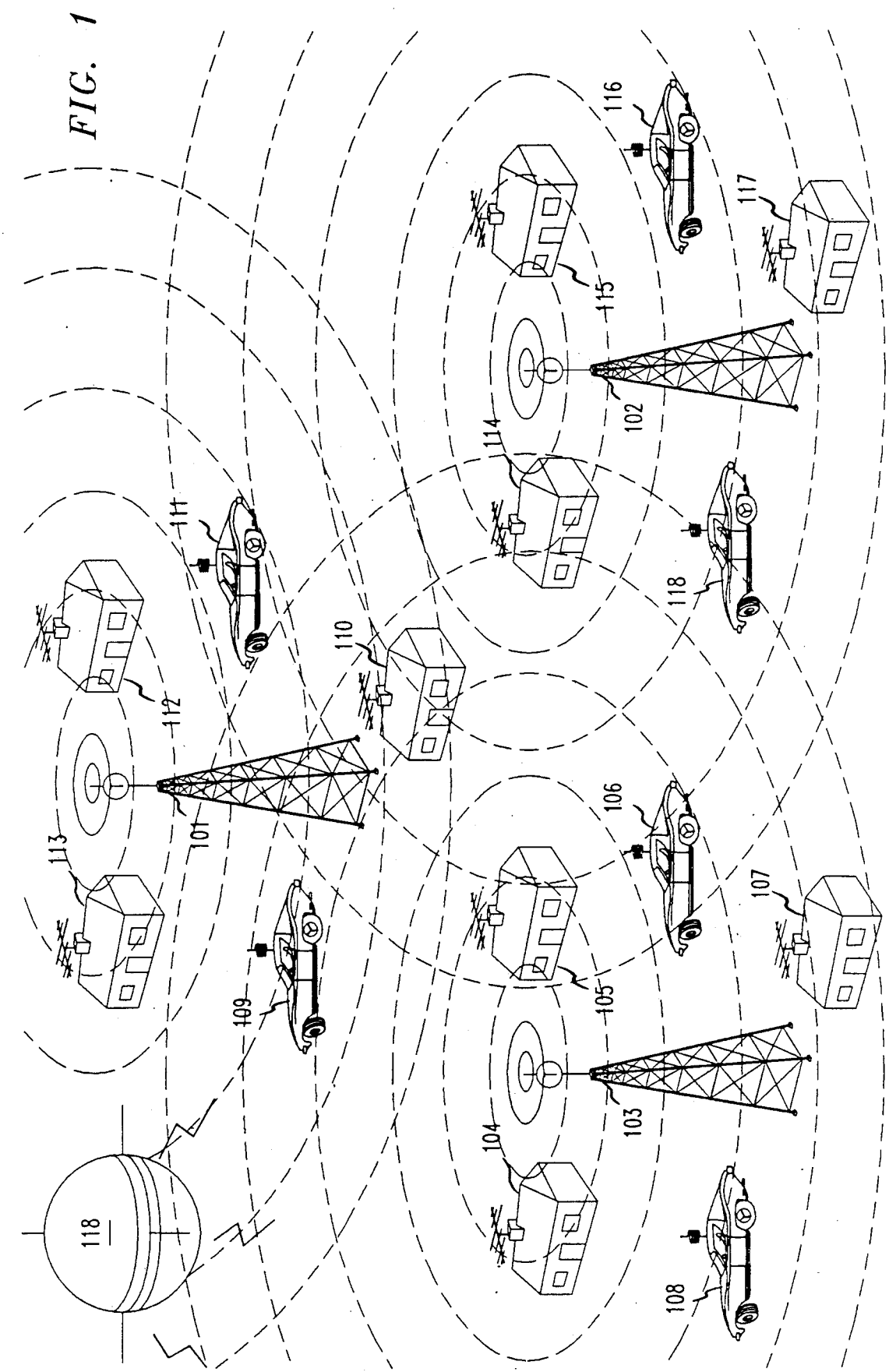
FIG. 1 shows a block diagram of a terrestial communication system.

FIG. 2 shows a transmitter comprising pseudorandom generator 101, summer 103 and modulator 104. Also shown in FIG. 1 is a data source 102 connected to the transmitter. The data source may be any type of equipment such as a multiplexer, computer, switch, etc. Further, while a the general term data is used, the data may actually be video, voice, or any other type of information.

In operation, signals from the data source 102 are transmitted to summer 103. Pseudorandom generator 101 also transmits a pseudorandom code to summer 103. The amplitude of the pseudorandom code is preferably adjusted to be much less than the amplitude of the data signals transmitted by the data source to summer 103. By adjusting the amplitude of pseudorandom generator 101 to be so small relative to the amplitude of the data source, the pseudorandom generator does not cause substantial interference with the data signal. The output from summer 103 will be comprised mostly of energy from the data signal and only a small portion, say one percent, energy from the pseudorandom signal. This pseudorandom signal is the identification code previously discussed.

This summed signal from summer 103 is then conveyed to modulator 104 as depicted in FIG. 2. Modulator 104 is then connected to an appropriate transmitting antenna (not shown) for transmission of the signal.

The pseudorandom signal generated at each transmitter in the communication system is preferably unique to that transmitter. Further, the pseudorandom signals at the transmitters should be substantially orthogonal to each other. Techniques for generating these orthogonal signals, such as maximal length shift registers with predetermined feedback paths and Gold codes, are well known in the art and can be used to practice this invention.

FIG. 3 shows an exemplary receiver for receiving the signal transmitted by the transmitter of FIG. 2. The receiver of FIG. 3 can demodulate and process the desired signal and can also identify the presence of, as well as the source of, interference caused by other transmitters in the communications system.

FIG. 3 comprises demodulator 301, correlators 302-306, comparator 307, table lookup means 308, and receiver-processor 309.

In operation, a signal is received at demodulator 301 via, for example, an antenna, (not shown). The demodulated signal is sent to receiver-process 309. Receiver-processor 309 performs any other channel functions necessary to receive the signal such as digital decoding, etc. Each of correlators 302-306 is matched to a separate one of the pseudorandom signals in the communication system. As such, each correlator repetitively correlates the received signal to a separate pseudorandom signal for predetermined time intervals. Because of the orthogonality of the pseudorandom signals, the output of any correlator is comprised of energy due for the most part to a signal which was transmitted from the transmitter associated with that pseudorandom signal.

For purposes of explanation, it is assumed that correlator 302 is matched to the pseudorandom signal transmitted from a transmitter which it is desired to receive information from. Thus, in FIG. 3, the output of correlator 302 should be relatively large compared with the outputs of the other correlators 303-306. Correlators 303-306, and any other correlators which are not shown, would be matched to the pseudorandom signals from other transmitters in the communication system. Any energy received from these other transmitters represents the undesired interference discussed previously herein.

In normal operation, when no other transmitters are causing interference, the outputs from correlators 303-306 would be substantially zero. Comparator 307 would note the large amplitude of the output of correlator 302 as compared to the amplitude output from correlators 303-306. Accordingly, no further action must be taken by the receiver.

Consider the case where the transmitter associated with the particular pseudorandom signal associated with correlator 303 is causing interference with the signal being received at the receiver of FIG. 3. In this case, the output amplitude of correlator 303, would get slightly larger and would approach the amplitude of the output of correlator 302. Comparator 307 would determine this difference. Depending upon the amount of tolerable interference at each receiver, comparator 307 is adjusted to output and alarm signal at an appropriate level. For example, if it is desired that each receiver receive interference signals which are no greater than 20 db below the desired signal, comparator 307 would be adjusted to output an alarm signal whenever any one or more outputs is greater than 20 db less than the desired signal.

Upon determining that substantial interference exits in the received signal, comparator 307 will output, onto bus 310, an identifier which addresses the particular correlator output which has grown to an unacceptable level. If the output from more than one correlator has grown to an unacceptable level, comparator 307 could, for example, output this information successively onto bus 310.

Table lookup 308 is arranged to sample the address on bus 310 at predetermined time intervals. Table lookup 308 then maps the address on bus 310 to the particular transmitter causing the interference. Table lookup 308, after doing so, will then output an identifier signal. The identifier signal could be the name of the party responsible for the transmitter causing the interfering signal. Further, the identifier signal can conveniently be displayed on a terminal or even transmitted out of band back to the interfering transmitter to inform it that it is causing interference. The transmitter causing the interference can then be adjusted or turned off to avoid such interference.

Correlators 302-306 must be synchronized with the incoming identifier codes. Techniques for implementing such synchronization are well known in the art. Further, correlators 302-306 may be replaced with matched filters, digital signal processors, or a variety of other means which are well known in the art.

Figure 4:
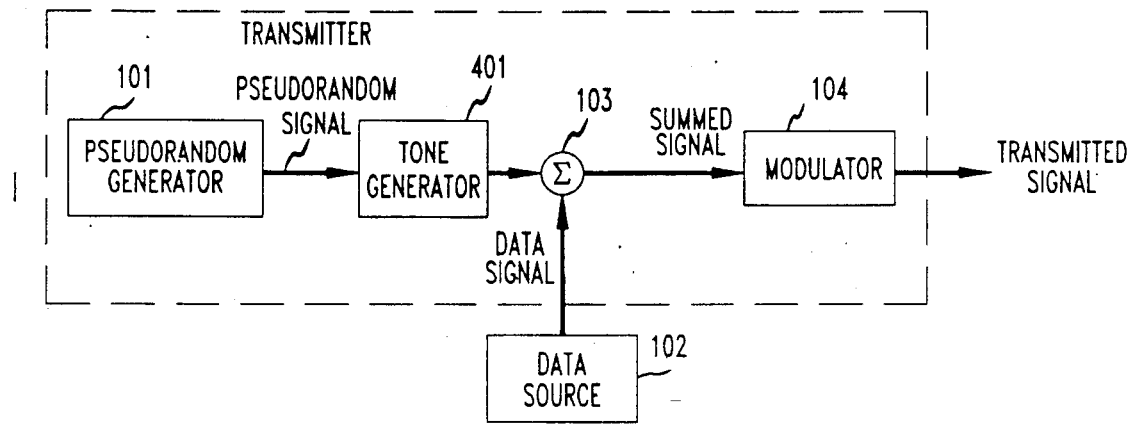
FIG. 4 depicts an alternative embodiment of a transmitter for use with the invention.

FIG. 4 shows an alternative embodiment of the invention. Corresponding elements in FIGs. 4 and 2 are labeled with corresponding numbers. In FIG. 4, rather than summing a sequence of bits with the data signal, a pseudorandom sequence of tones, generated by tone generator 401, is superimposed onto the transmitted data signal. The tone generator 401 would generate a single frequency tone at a different place in the bandwidth of the data signal at different times. The remainder of the operation of FIG. 4 is analysis to that of FIG. 2 and, therefore, is not described in any further detail.

Figure 5:
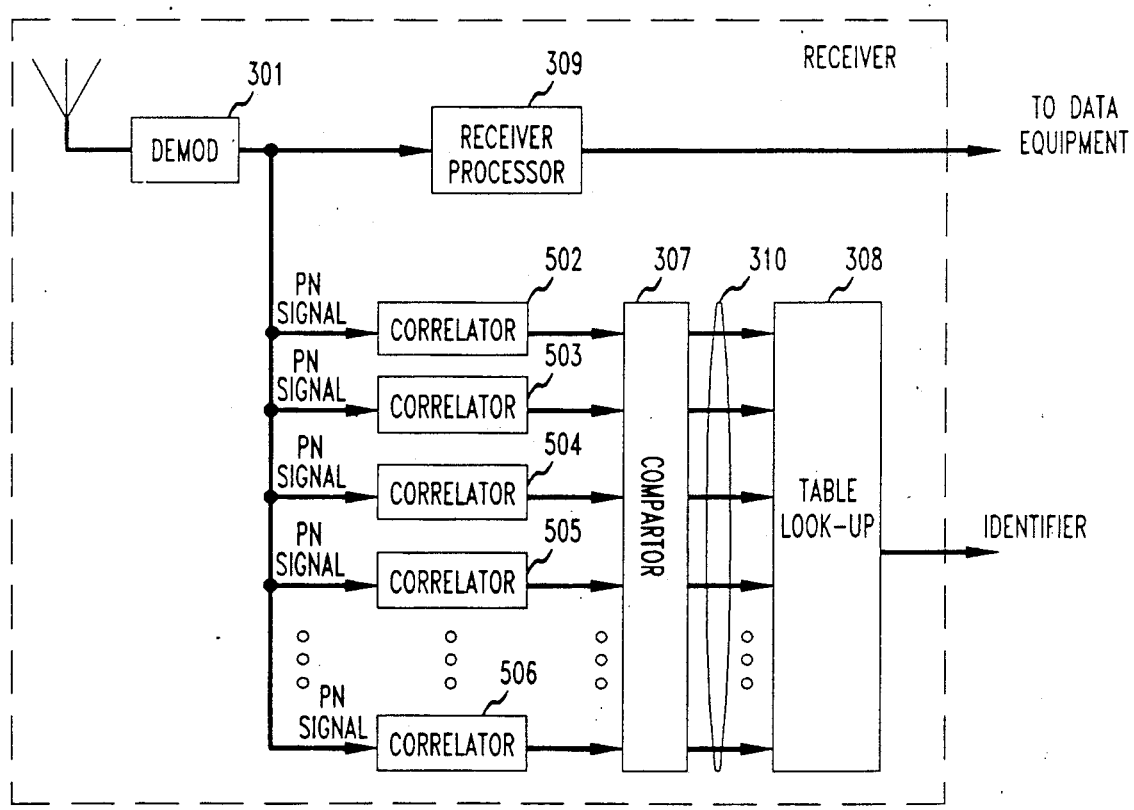
FIG. 5 shows a block diagram of a receiver for receiving signals transmitted by the transmitter of FIG. 4.

FIG. 5 is a conceptual block diagram of a receiver to be used in a communications system with transmitters such as that of FIG. 4. FIG. 5 is similar to FIG. 3, however, correlators 502-506 would be designed slightly different from correlators 302-306. These correlators 502-506 would also generate tones at different parts of the frequency band of the transmitted signal at pseudorandom times. These tones could be used to tune a narrow band filter to the tones of the tone generator being transmitted by the transmitting terminal. Thus, if the tones generated at the particular times in a particular correlator match those of the corresponding transmitter, than that correlator will output a large amplitude signal. If the tones do not match up, than that correlator will output a much smaller signal. This is similar to implementing the ID signal as a frequency hopped spread spectrum signal. Thus, by using a comparator as previously discussed, the source of, and presence of, interference can be ascertained, as before.

It is to be understood that the examples previously set forth herein are for illustrative purposes and are not to be construed as limiting the scope of the claims to the specific embodiments described. For example, while spread spectrum techniques have been utilized, any suitable identification signal may be used so long as it does not substantially interfere with the data signal itself. The identification signal may be superimposed either before modulating, as described previously, or after modulating the signal to be transmitted. For example, the ID signal may be combined with the data signal and directly input to a power amplifier. In this embodiment, modulator 104 would be replaced with a power amplifier and demodulator 301 would be replaced with any typical receiver front end. The invention may be utilized in satellite communications, terrestrial communications, fiber optics, cable television, or anywhere else where interference among a variety of users is a problem. In fact, a main advantage of the present invention is that the ID signal is independent of the particular data being transmitted.

The invention may also be advantageously utilized by assigning one identification code to a plurality of transmitters such as a particular network where several users share the same satellite transmitter. While this will not identify the exact source of the interference, it will certainly narrow down the possibilities by determining that the interference is coming from one transmitter of a particular group. This technique would, however, require less mutually orthogonal identification codes to implement the system. Accordingly, less correlators would be required, resulting in a less expensive system. Furthermore, since less identification codes are required, each identification code will have a shorter length. Therefore, the compare and table lookup can be done more frequently resulting in quicker detection of interference.

I claim:

1. A receiver for receiving a desired transmitted signal, from among a plurality of transmitted signals, each of the transmitted signals comprising a data signal and a superimposed identification signal, each identification signal having a predetermined amplitude, the receiver comprising:
   means for comparing the amplitude of the identification signal of the desired transmitted signal to an amplitude of an identification signal of at least one other transmitted signal from the plurality transmitted signals; and
   means for causing an alarm condition when said means for comparing indicates that said amplitude of said identification signal from said at least one other transmitted signal is greater than a predetermined fraction of said amplitude of said identification signal of said desired transmitted signal.

2. The receiver of claim 1 wherein the identification signal is a pseudorandom sequence of tones.

3. The receiver of claim 1 wherein the identification signal is a pseudorandom sequence of digital bits.

4. The receiver of claims 1, 2 or 3 further including means for repetitively correlating the received signal to a plurality of predetermined identification codes for a predetermined amount of time.

5. The receiver of claims 1, 2, or 3 further comprising table lookup means connected to said means for comparing for identifying one or more transmitters that are associated with a particular identification code.

6. The receiver claims 1, 2, or 3 wherein the receiver is a satellite receiver.

7. The receiver claim 4 wherein the receiver is a satellite receiver.

8. The receiver claim 5 wherein the receiver is a satellite receiver.

9. In a receiver for receiving a desired transmitted signal, from among a plurality of transmitted signals, the transmitted signals comprising a data signal and a superimposed identification signal, each identification signal having a predetermined amplitude, a method of identifying interference in a transmitted signal comprising the steps of:
   comparing the amplitude of the identification signal of the desired transmitted signal to the amplitude of the identification signal of at least one other transmitted signal from the plurality of transmitted signals;
   outputting an alarm signal when said step of comparing indicates that said amplitude of said identification signal from said at least one other transmitted signal is greater than a predetermined fraction of said amplitude of said identification signal of said desired transmitted signal.

10. The method of claim 9 wherein the identification signal is a pseudorandom sequence of tones.

11. The method of claim 9 wherein the identification signal is a pseudorandom sequence of digital bits.

12. The method of claims 9, 10, or 11 further including the step of repetitively correlating the received signal to a plurality of predetermined identification codes for a predetermined amount of time.

13. The method of claims 9, 10, or 11 further comprising the step of identifying, one or more transmitters that are associated with a particular identification code causing an alarm condition.

14. The method of claims 9, 10, or 11 wherein the receiver is a satellite receiver.

15. The method of claim 12 wherein the receiver is a satellite receiver.

16. The method of claim 13 wherein the receiver is a satellite receiver.

* * * * *